US007711814B1

(12) United States Patent
Emerick et al.

(10) Patent No.: US 7,711,814 B1
(45) Date of Patent: May 4, 2010

(54) METHOD AND SYSTEM FOR REMOTE MONITORING OF A POWER SUPPLY DEVICE WITH USER REGISTRATION CAPABILITY

(75) Inventors: Gregory M. Emerick, O'Fallon, MO (US); David S. Cowan, Ballwin, MO (US); Maureen C. Politte, Lake St. Louis, MO (US); Arnaud J. R. Denis, Castlegar (IE)

(73) Assignee: American Power Conversion Corporation, West Kingston, RI (US)

( * ) Notice: Subject to any disclaimer, the term of this patent is extended or adjusted under 35 U.S.C. 154(b) by 716 days.

(21) Appl. No.: 11/302,578

(22) Filed: Dec. 13, 2005

Related U.S. Application Data

(60) Provisional application No. 60/635,797, filed on Dec. 13, 2004.

(51) Int. Cl.
*G06F 15/173* (2006.01)
*G06F 15/16* (2006.01)
*G06F 7/06* (2006.01)
*G06F 17/30* (2006.01)

(52) U.S. Cl. .................. 709/224; 370/241; 702/60; 709/200; 709/206

(58) Field of Classification Search .............. 700/9; 702/188, 60; 713/200; 719/310; 709/224, 709/200, 206; 370/241
See application file for complete search history.

(56) References Cited

U.S. PATENT DOCUMENTS

| 4,349,879 | A | 9/1982 | Peddie et al. |
| 4,521,645 | A | 6/1985 | Carroll |
| 4,568,934 | A | 2/1986 | Allgood |
| 4,668,939 | A | 5/1987 | Kimura et al. |
| 4,718,025 | A | 1/1988 | Minor et al. |
| 4,747,041 | A | 5/1988 | Engel et al. |
| 4,751,648 | A | 6/1988 | Sears, III et al. |
| 4,816,208 | A | 3/1989 | Woods et al. |
| 4,823,290 | A | 4/1989 | Fasack et al. |

(Continued)

FOREIGN PATENT DOCUMENTS

AU          3855395 A1     6/1996

(Continued)

OTHER PUBLICATIONS

Simon M. Lucas, Web-based evaluation and deployment of pattern recognizers, 2002, Proceedings of 16th International Conference onPattern Recognition, vol. 3, pp. 419-422 vol. 3).*

(Continued)

*Primary Examiner*—Wing F Chan
*Assistant Examiner*—Ruolei Zong
(74) *Attorney, Agent, or Firm*—Lando & Anastasi, LLP

(57) ABSTRACT

A method for monitoring and reporting information regarding status of a power supply/management device operated by a user comprises detecting the status of the device using a monitoring device having an application interface configured to communicate over a communication network, generating a status update indication using a self-describing computer language and sending the status update indication over the communication network to a remote computer, and associating the user with the status update information for the remote device using the remote computer.

15 Claims, 11 Drawing Sheets

U.S. PATENT DOCUMENTS

| | | | |
|---|---|---|---|
| 4,964,065 A | 10/1990 | Hicks et al. | |
| 5,061,916 A | 10/1991 | French et al. | |
| 5,086,385 A | 2/1992 | Launey et al. | |
| 5,097,328 A | 3/1992 | Boyette | |
| 5,153,837 A | 10/1992 | Shaffer et al. | |
| 5,189,394 A | 2/1993 | Walter et al. | |
| 5,216,623 A | 6/1993 | Barrett et al. | |
| 5,220,522 A | 6/1993 | Wilson et al. | |
| 5,225,997 A | 7/1993 | Lederer et al. | |
| 5,229,850 A | 7/1993 | Toyoshima | |
| 5,289,275 A | 2/1994 | Ishii et al. | |
| 5,367,670 A | 11/1994 | Ward et al. | |
| 5,382,943 A | 1/1995 | Tanaka | |
| 5,395,042 A | 3/1995 | Riley et al. | |
| 5,400,246 A | 3/1995 | Wilson et al. | |
| 5,404,136 A | 4/1995 | Marsden | |
| 5,475,364 A | 12/1995 | Kenet | |
| 5,491,511 A | 2/1996 | Odle | |
| 5,508,941 A | 4/1996 | Leplingard et al. | |
| 5,528,507 A | 6/1996 | McNamara et al. | |
| 5,553,609 A | 9/1996 | Chen et al. | |
| 5,566,339 A | 10/1996 | Perholtz et al. | |
| 5,572,195 A | 11/1996 | Heller et al. | |
| 5,581,478 A | 12/1996 | Cruse et al. | |
| 5,621,662 A | 4/1997 | Humphries et al. | |
| 5,732,074 A | 3/1998 | Spaur et al. | |
| 5,742,762 A | 4/1998 | Scholl et al. | |
| RE35,793 E | 5/1998 | Halpern | |
| 5,798,798 A | 8/1998 | Rector et al. | |
| 5,805,458 A | 9/1998 | McNamara et al. | |
| 5,812,055 A | 9/1998 | Candy et al. | |
| 5,818,725 A | 10/1998 | McNamara et al. | |
| 5,822,302 A | 10/1998 | Landry, Jr. et al. | |
| 5,870,698 A | 2/1999 | Riedel et al. | |
| 5,892,440 A | 4/1999 | Bryan | |
| 5,905,867 A | 5/1999 | Giorgio et al. | |
| 5,926,210 A | 7/1999 | Hackett et al. | |
| 5,949,974 A | 9/1999 | Ewing et al. | |
| 5,955,946 A | 9/1999 | Beheshti et al. | |
| 5,963,457 A | 10/1999 | Kanoi et al. | |
| 5,963,958 A | 10/1999 | Cottrill | |
| 5,968,116 A | 10/1999 | Day, II et al. | |
| 5,974,237 A | 10/1999 | Shurmer et al. | |
| 5,978,594 A | 11/1999 | Bonnell et al. | |
| 5,987,614 A | 11/1999 | Mitchell et al. | |
| 5,991,885 A | 11/1999 | Chang et al. | |
| 5,999,179 A | 12/1999 | Kekic et al. | |
| 6,052,750 A | 4/2000 | Lea | |
| 6,055,480 A | 4/2000 | Nevo et al. | |
| 6,058,434 A | 5/2000 | Wilt et al. | |
| 6,081,606 A | 6/2000 | Hansen et al. | |
| 6,085,243 A | 7/2000 | Fletcher et al. | |
| 6,088,816 A | 7/2000 | Nouri et al. | |
| 6,094,676 A | 7/2000 | Gray et al. | |
| 6,104,868 A | 8/2000 | Peters et al. | |
| 6,105,061 A | 8/2000 | Nakai | |
| 6,108,782 A | 8/2000 | Fletcher et al. | |
| 6,112,235 A | 8/2000 | Spofford | |
| 6,122,603 A | 9/2000 | Budike, Jr. | |
| 6,122,639 A | 9/2000 | Babu et al. | |
| 6,138,078 A | 10/2000 | Canada et al. | |
| 6,138,249 A | 10/2000 | Nolet | |
| 6,139,177 A | 10/2000 | Venkatraman et al. | |
| 6,157,943 A | 12/2000 | Meyer | |
| 6,167,406 A | 12/2000 | Hoskins et al. | |
| 6,170,007 B1 | 1/2001 | Venkatraman et al. | |
| 6,175,866 B1 | 1/2001 | Holloway et al. | |
| 6,175,927 B1 | 1/2001 | Cromer et al. | |
| 6,177,884 B1 | 1/2001 | Hunt et al. | |
| 6,182,094 B1 | 1/2001 | Humpleman et al. | |
| 6,182,157 B1 | 1/2001 | Schlener et al. | |
| 6,189,109 B1 | 2/2001 | Sheikh et al. | |
| 6,195,018 B1 | 2/2001 | Ragle et al. | |
| 6,208,261 B1 | 3/2001 | Olstead | |
| 6,208,345 B1 | 3/2001 | Sheard et al. | |
| 6,215,404 B1 | 4/2001 | Morales | |
| 6,216,956 B1 | 4/2001 | Ehlers et al. | |
| 6,219,628 B1 | 4/2001 | Kodosky et al. | |
| 6,229,429 B1 | 5/2001 | Horon | |
| 6,236,332 B1 | 5/2001 | Conkright et al. | |
| 6,259,956 B1 | 7/2001 | Myers et al. | |
| 6,266,721 B1 | 7/2001 | Sheikh et al. | |
| 6,271,845 B1 | 8/2001 | Richardson | |
| 6,272,537 B1 | 8/2001 | Kekic et al. | |
| 6,281,790 B1 | 8/2001 | Kimmel et al. | |
| 6,282,546 B1 | 8/2001 | Gleichauf et al. | |
| 6,304,900 B1 | 10/2001 | Cromer et al. | |
| 6,311,105 B1 | 10/2001 | Budike, Jr. | |
| 6,324,644 B1 | 11/2001 | Rakavy et al. | |
| 6,332,202 B1 | 12/2001 | Sheikh et al. | |
| 6,343,320 B1 | 1/2002 | Fairchild et al. | |
| 6,360,255 B1 | 3/2002 | McCormack et al. | |
| 6,363,421 B2 | 3/2002 | Barker et al. | |
| 6,363,422 B1 | 3/2002 | Hunter et al. | |
| 6,373,840 B1 | 4/2002 | Chen | |
| 6,374,296 B1 | 4/2002 | Lim et al. | |
| 6,375,614 B1 | 4/2002 | Braun et al. | |
| 6,381,700 B1 | 4/2002 | Yoshida | |
| 6,389,464 B1 | 5/2002 | Krishnamurthy et al. | |
| 6,400,103 B1 | 6/2002 | Adamson | |
| 6,400,996 B1 | 6/2002 | Hoffberg et al. | |
| 6,402,691 B1 | 6/2002 | Peddicord et al. | |
| 6,404,348 B1 | 6/2002 | Wilfong | |
| 6,477,667 B1 | 11/2002 | Levi et al. | |
| 6,496,855 B1 * | 12/2002 | Hunt et al. | 709/217 |
| 6,505,086 B1 | 1/2003 | Dodd, Jr. et al. | |
| 6,505,256 B1 | 1/2003 | York | |
| 6,510,350 B1 * | 1/2003 | Steen et al. | 700/9 |
| 6,529,230 B1 | 3/2003 | Chong | |
| 6,529,936 B1 | 3/2003 | Mayo et al. | |
| 6,553,336 B1 | 4/2003 | Johnson et al. | |
| 6,553,418 B1 | 4/2003 | Collins et al. | |
| 6,591,279 B1 | 7/2003 | Emens et al. | |
| 6,611,866 B1 | 8/2003 | Goldman | |
| 6,615,201 B1 | 9/2003 | Seshadri et al. | |
| 6,658,595 B1 | 12/2003 | Thamattoor | |
| 6,681,787 B2 | 1/2004 | Tinsley et al. | |
| 6,686,838 B1 | 2/2004 | Rezvani et al. | |
| 6,714,977 B1 | 3/2004 | Fowler et al. | |
| 6,756,998 B1 | 6/2004 | Bilger | |
| 6,757,714 B1 | 6/2004 | Hansen | 709/206 |
| 6,801,940 B1 | 10/2004 | Moran et al. | |
| 6,829,630 B1 | 12/2004 | Pajak et al. | |
| 6,985,901 B1 | 1/2006 | Sachse et al. | |
| 6,990,513 B2 | 1/2006 | Belfiore et al. | |
| 7,051,096 B1 | 5/2006 | Krawiec et al. | |
| 7,072,987 B2 * | 7/2006 | Jurisch et al. | 709/249 |
| 7,117,239 B1 * | 10/2006 | Hansen | 709/200 |
| 7,120,689 B2 | 10/2006 | Gonsalves et al. | |
| 7,159,022 B2 | 1/2007 | Primm et al. | |
| 7,207,041 B2 | 4/2007 | Elson et al. | |
| 7,292,898 B2 * | 11/2007 | Clark et al. | 700/9 |
| 2001/0005894 A1 | 6/2001 | Fukui | |
| 2001/0034735 A1 * | 10/2001 | Sugiyama | 707/104.1 |
| 2001/0047213 A1 | 11/2001 | Sepe, Jr. | |
| 2001/0047410 A1 | 11/2001 | Defosse | |
| 2001/0052006 A1 | 12/2001 | Barker et al. | |
| 2001/0055965 A1 | 12/2001 | Delp et al. | |
| 2002/0003575 A1 | 1/2002 | Marchese | |
| 2002/0023258 A1 | 2/2002 | Elwahab et al. | |
| 2002/0041603 A1 | 4/2002 | Kato | |
| 2002/0043969 A1 | 4/2002 | Duncan et al. | |
| 2002/0055909 A1 * | 5/2002 | Fung et al. | 705/42 |
| 2002/0071031 A1 | 6/2002 | Lord et al. | |

| | | | |
|---|---|---|---|
| 2002/0072868 A1 | 6/2002 | Bartone et al. | |
| 2002/0083378 A1 | 6/2002 | Nickels | |
| 2002/0124081 A1 | 9/2002 | Primm et al. | |
| 2002/0152298 A1 | 10/2002 | Kikta et al. | |
| 2002/0161885 A1 | 10/2002 | Childers et al. | |
| 2002/0174223 A1 | 11/2002 | Childers et al. | |
| 2002/0194492 A1* | 12/2002 | Choi et al. | 713/200 |
| 2003/0098789 A1 | 5/2003 | Murakami et al. | |
| 2003/0126136 A1* | 7/2003 | Omoigui | 707/10 |
| 2003/0204756 A1 | 10/2003 | Ransom et al. | |
| 2004/0160897 A1* | 8/2004 | Fowler et al. | 370/241 |
| 2004/0230566 A1* | 11/2004 | Balijepalli et al. | 707/3 |
| 2005/0071093 A1* | 3/2005 | Stefan | 702/60 |
| 2008/0215727 A1 | 9/2008 | Denis et al. | |

FOREIGN PATENT DOCUMENTS

| | | |
|---|---|---|
| AU | 5601198 A1 | 7/1998 |
| AU | 0016673 A5 | 6/2000 |
| CA | 2300053 AA | 2/1999 |
| CA | 2312075 AA | 6/1999 |
| CA | 2328939 AA | 9/1999 |
| CN | 87100353 A | 9/1988 |
| CN | 1294350 A | 5/2001 |
| EP | 0591585 B1 | 4/1994 |
| EP | 0738065 A1 | 3/1996 |
| EP | 0744112 B1 | 11/1996 |
| EP | 0859489 A2 | 1/1998 |
| EP | 0917034 B1 | 10/1998 |
| EP | 0963076 A3 | 5/1999 |
| EP | 0927933 A2 | 7/1999 |
| EP | 0977112 A2 | 7/1999 |
| EP | 0956680 A1 | 11/1999 |
| EP | 1014622 A2 | 12/1999 |
| EP | 0992100 | 4/2000 |
| EP | 1002268 A1 | 5/2000 |
| EP | 1032884 A1 | 9/2000 |
| EP | 1049291 A2 | 11/2000 |
| EP | 1115264 A2 | 12/2000 |
| EP | 1124301 A2 | 12/2000 |
| EP | 1096724 | 5/2001 |
| EP | 1150188 A2 | 10/2001 |
| EP | 1178628 A2 | 2/2002 |
| GB | 2335124 A | 9/1999 |
| GB | 2343036 A | 4/2000 |
| GB | 2344718 A | 6/2000 |
| GB | 2351205 A | 12/2000 |
| GB | 2355163 A | 4/2001 |
| GB | 2359369 A | 8/2001 |
| JP | 5040889 | 2/1993 |
| JP | 11219388 A2 | 8/1999 |
| JP | 2000209204 A2 | 7/2000 |
| WO | 9615615 | 5/1996 |
| WO | 9826541 | 6/1998 |
| WO | 9915950 | 4/1999 |
| WO | 0035177 | 6/2000 |
| WO | 0073866 A1 | 12/2000 |
| WO | 0079500 A1 | 12/2000 |
| WO | 0101366 A2 | 1/2001 |
| WO | 0108396 | 2/2001 |
| WO | 0182028 A2 | 11/2001 |
| WO | 0193042 A2 | 12/2001 |
| WO | 0197907 A2 | 12/2001 |
| WO | 0201877 A1 | 1/2002 |
| WO | 0233980 A2 | 4/2002 |
| WO | 0237280 A2 | 5/2002 |
| WO | 0079500 C2 | 6/2002 |

OTHER PUBLICATIONS

Kwak et al., Senddata: an agent for data processing systems using email, Aug. 6, 2002, Conference Proceeding of the IEEE International Performance, Computing, and Communications Conference, pp. 264-270).*

Axis Communications, "Axis 2400/2401 Administration Manual Version 1.1", www.axis.com/techsup/cam_2400/index.htm, version 1.1xx, part No. 16741, pp. 1-78, Jul. 1999.

Axis Communications, "Axis 200+ and 240 Camera Server: User's Guide", www.axis.com/techsup/cam_servers/cam_240/index.htm, pp. 1-38, Jan. 1999.

Axis Communications, "Network Camera Developments Enable Live Web Imaging", Axis 2100 white paper, www.axis.com/products/videos/camera/documentation.htm, pp. 1-12, Nov. 1999.

Sinetica Corp., "Newsletter, Issue One 99", Sinetica, UK, www.sinetica.co.uk, Feb. 1999, XP002160504, 4 pp.

Sinetica Corp., "Netcom TH. Advanced SNMP Agent with Web Browser Support", Sinetica, UK, www.sinetica.co.uk, Apr. 2000, XP002160505, 2 pp.

Duran, J.W. et al. "Virtual personal computers and the portable network," IEEE Proceedings of Inter. Performance, Computing, and Communications, IPCCC'99, p. 52-56, Feb. 1999.

* cited by examiner

| Company | Identifier | Description | Ticketid | TicketState | Count | Date |
|---|---|---|---|---|---|---|
| Customer 1 | WA0429150022 | Environmental Violates t... | WA042915... | Open | | 12/... |
| Customer 2 | ZA0441003734 | Environmental A violation | ZA0441003... | Open | 9 | 12/... |
| Acme Corpration | ZA0511000237 | Environmental A violation | ZA0511000... | Open | | 12/... |
| APC Testing | ZA0441003734 | Environmental A violation | ZA0441003... | Closed | 9 | 12/... |
| Another Customer | ZA0441003734 | Environmental A violation | ZA0441003... | Closed | 4 | 12/... |
| APC | GF0317162752 | No update has been rec... | GF031716... | Closed | 118 | 12/... |
| Testing 1 | SE9947GL0006 | No update has been rec... | SE9947GL... | Closed | 118 | 12/... |
| Customer 9 | ZA0518004488 | Environmental Violates t... | ZA0518004... | Closed | | 12/... |
| joe bloggs | SE010000091 | No update has been rec... | SE010000... | Closed | 118 | 12/... |
| Company 3 | XF0327001135 | No update has been rec... | XF032700... | Closed | 118 | 12/... |
| Corpo 4 | XF0240013385 | No update has been rec... | XF0240013... | Closed | 11 | 12/... |
| RMS | IA0347110270 | No update has been rec... | IA0347110... | Closed | 118 | 12/... |
| Customer 7 | ZA0511000237 | Environmental A violation | ZA0511000... | Closed | | 12/... |
| Big Customer | ZA0451005584 | No update has been rec... | ZA0451005... | Closed | 1705 | 12/... |
| Jane Doe | XF0320002793 | No update has been rec... | XF0320002... | Closed | 118 | 12/... |
| Corpo 1 | ED042001923 | UPS: One or more faulty... | ED042001... | Closed | 2 | 12/... |
| Testing 4 | SE99456L0004 | No update has been rec... | SE99456L... | Closed | 118 | 12/... |
| Customer 765 | WA0503110114 | Environmental A violation | WA050311... | Closed | 118 | 12/... |
| Customer 3 | ZA0451006434 | No update has been rec... | ZA045006... | Closed | 908 | 12/... |
| Customer | XF0324002092 | Environmental A violation | XF0324002... | Closed | 118 | 12/... |
| Small Customer | ZA0510009158 | No update has been rec... | ZA0510009... | Closed | 4 | 12/... |
| APC 90 | WA0534210556 | No update has been rec... | WA053421... | Closed | 118 | 12/... |
| APC | WA0441110181 | No update has been rec... | WA044111... | Closed | 118 | 12/... |
| Company 7 | WA0526110372 | No update has been rec... | WA052611... | Closed | 118 | 12/... |

RMS Quarterly Report (June, 2005 - September, 2005) — 120

Sample Corporation         Contact:    John Doe
1 Corporation Drive,                   John Doe@sample.com    } 122
Corpo Town, RI01234
(123) - 123 4567

124

Executive Summary

Availability:
126 Was your system availability compromised over the last quarter?  [Yes]
    Is there a potential risk for system availability to be compromised over the next quarter?  [Yes]

Actions Required:
128 In order to avoid future issues, please review the Recommendations and Details section with:
    - Air conditioning Technician Event Summary — 130                             132

| Severe | 662 |
| Warning | 1391 |
| Informational | 1570 |
| Total | 3623 |

134

Severe Events
| Total | Description |
| 500 | Environmental: A fault exists at sensor 1 (Door 1) |
| 133 | Environmental: A fault exists at sensor 2 (Door 2) |
| 7 | InfraStruXure PDU: A violation of the undervoltage threshold exists for phase L1 of the main input |
| 7 | InfraStruXure PDU: A violation of the undervoltage threshold exists for phase L2 of the main input |
| 6 | InfraStruXure PDU: A violation of the undervoltage threshold exists for phase L3 of the main input |
| 9 | UPS: Cannot switch to bypass; the input voltage or frequency is not within its defined limits |

FIG. 4

_138_
Details
_140_

| UPS | Load (%) | | | Balanced | Runtime (min) |
|---|---|---|---|---|---|
| | Phase 1 | Phase 2 | Phase 3 | | |
| ED0318003562<br>Symmetra 80K.ISX (my Sym) | 55.0 | 60.0 | 50.0 | YES | 880.0 |
| YS0303210738<br>Smart-UPS RT 5000 XL.ISX | | | | NA | 9999.0 |
| WA9925002140<br>Silicon DP310E.ISX | 0.0 | 0.0 | 0.0 | YES | 256.0 |
| ED0440002046<br>Symmetra LX 16000.ISX | 60.0 | 50.0 | | YES | 202.0 |

_142_

| UPS | Power (Watts) | | | | Balanced | Power Factor | | | |
|---|---|---|---|---|---|---|---|---|---|
| | Phase 1 | Phase 2 | Phase 3 | Total | | Phase 1 | Phase 2 | Phase 3 | Total |
| JL1015200422345678 | 1.4 | 1.4 | 1.4 | 4.2 | YES | 1.0 | 1.0 | 1.0 | 3.0 |

1 devices need attention
Only PDU devices that support power values are shown.

_144_

| Environment | Probe 1 | | Probe 2 | |
|---|---|---|---|---|
| | Temperature | Humidity | Temperature | Humidity |
| WA0412160047<br>Environmental Management System.ISX | | | | |

Temperatures expressed in Degrees Fahrenheit

FIG. 4 (continued)

─ 136
Recommendations

The Details section of this report contains data substantiating the following recommendations.

Environmental Monitoring Units

- Humidity above 60%. High humidity can be damaging for metallic parts as well as being a hazard risk for live electrical components. If the humidity is high, it is important to verify the proper operation of any de-humidifier. In case there is no device to reduce the humidity, it is strongly recommended to address this as quickly as possible.

While these issues are not immediately impacting the device, it is recommended that they be investigated.

FIG. 4 (continued)

METHOD AND SYSTEM FOR REMOTE MONITORING OF A POWER SUPPLY DEVICE WITH USER REGISTRATION CAPABILITY

RELATED APPLICATIONS

This application claims priority to U.S. Provisional Application Ser. No. 60/635,797, filed Dec. 13, 2004 and entitled, "Remote Monitoring System," which is herein incorporated by reference.

BACKGROUND OF THE INVENTION

Today, companies and persons rely on having consistent supply of power to electronic devices more than ever. Without power, companies may be unable to manufacture goods, or to operate at all, such as if the company is in the business of supplying information over the Internet. Without power, businesses and individuals may be completely incapacitated regarding critical activities, such as making goods, providing services, and transacting personal finances (e.g., filing tax returns, and paying bills).

Frequently, individuals and companies monitor the supply of power to electronic devices or facilities to ensure that their affairs and/or businesses are not significantly affected by a power outage, a change in status or some other power alteration. Uninterruptible power supplies (UPSs) are often used to provide backup power in case of a power outage. UPSs are commonly used on computing equipment to guard against data being lost due to a power outage before the data are saved. UPSs used with computing equipment also help to guard against a loss in service by providers of information over the Internet, such as by servers, e.g., hosting web pages.

Device status is often monitored and reported to the individual or company owning a device using email notification or the Plain Old Telephone System (POTS), which requires the installation of a remote monitoring unit at the customer site and is physically dialed into to get updates and specifics. Frequently, companies are obligated to provide manpower at substantial cost so that electronic devices can be monitored and reported on a regular basis.

SUMMARY OF THE INVENTION

In general, in an aspect, the invention provides a method for monitoring and reporting information regarding status of a power supply/management device operated by a user. The method includes detecting the status of the device using a monitoring device having an application interface configured to communicate over a communication network, generating a status update indication using a self-describing computer language and sending the status update indication over the communication network to a remote computer, and associating the user with the status update information for the remote device using the remote computer.

Implementations of the invention may include one or more of the following features. The method can include sending the user registration information to the remote computer comprises sending the user registration information via email. Sending the user registration information to the remote computer can comprise sending the user registration information via HTTP post. Sending the status update indication to the remote computer can comprise sending the status update indication via HTTP post. The method can include generating a user registration using a self-describing computer language and sending the user registration to the remote computer. The method may also include associating the user with the status update information for the remote device using mapping of the user and the device. Sending the user registration information to the remote computer can comprise sending the user registration information via a web service, the web service communicating the user registration to the remote computer. The self describing computer language can include eXtensible Markup Language (XML).

In general, in another aspect, the invention provides a system for communicating via a communication network with remote devices connected to at least one management device to monitor and supply a status associated with the remote devices. The system includes a first communication interface connected to the at least one management device configured to transfer status data associated with the remote devices over the communication network, a second communication interface configured to transfer data related to a user registration for a user having at least one remote device in communication with the communication network, a processor configured to receive the status data and the user registration data over the communication network and associate the user registration data with the status data associated with the remote devices, and a manager coupled to the processor and configured to receive and report the status data to the user.

Implementations of the invention may include one or more of the following features. The second communication interface can include a remote monitoring service web site on which the user enters user registration data. The manager can produce an event ticket when the status data associated with the remote device indicates a change in status. The processor can be further configured to inspect and manage user contracts associated with the user, and associate the status data and the user registration data based on information in the user contract. The manager can create an executive report and communicates the executive report to the user over a third communication network. Device data retrieved can be utilized for data mining, predictive failure analysis, sales support, quality improvement and technical service support.

Characteristics of the invention may include one or more of the following capabilities. A monitoring center can provide a human interface for analyzing and reporting data related to devices at remote locations. Customers can be directly contacted via phone, email or other means upon severe event occurrence. Service start-up of devices is monitored by the remote monitoring center. Device registration can be performed automatically in response to device purchase. Outsourcing for management of tickets, contracts or bulletin board notices may be alleviated. Data may be analyzed to determine maintenance needs. Implementation of additional remote monitoring devices at the site of electronic devices is avoided. Troubleshooting can be accomplished via a service center and can occur at the time of event occurrence. Devices can be controlled via the remote monitoring service to alter operations when events occur. Manpower for monitoring internal systems at the customer site and cost related thereto can be reduced.

These and other capabilities of the invention, along with the invention itself, will be more fully understood after a review of the following figures, detailed description, and claims.

BRIEF DESCRIPTION OF THE FIGURES

FIGS. 3A-3C are exemplary screen displays of event management information associated with monitored locations.

FIG. 4 is an exemplary report of status information associated with a monitored location.

DETAILED DESCRIPTION OF PREFERRED EMBODIMENTS

Embodiments of the invention provide techniques for monitoring devices from a remote location, reporting the status of devices and controlling devices from the remote location. Devices can be monitored at distributed locations, reported to a centralized monitoring system and controlled by the centralized system. Remote management can be accomplished using a web portal, an application interface and a remote monitoring event manager. The application interface is associated with electronic devices. Data collected from the application interface can be transported to the event manager as an email. Data collected from the application interface and the web portal can be displayed as Hyper-Text Transfer Protocol (HTTP) post data at the remote monitoring center. Customer information can be sent from the monitored device at startup, and can be XML formatted. Device data can also be XML formatted. The system includes a built in trouble ticketing system and a notification system. A customer having a device can utilize a remote monitoring system web site to enter contact information, create and view reports and define event escalation rules that are related to the monitored devices. The application interface acts as a proxy between the device and the event manager at the remote monitoring center. The event manager monitors incoming device alarms at a location remote from the devices. Devices monitored can include uninterruptible power supplies (UPS's), cooling devices, environmental probes, and power distribution devices. Devices can include power management software or a management device to monitor performance. Devices containing the power management software can be distributed throughout the country, and even globally. Reports on the status of devices can be generated and information provided to users in various ways such as over the Internet. Other embodiments are within the scope of the invention.

Figure 1:
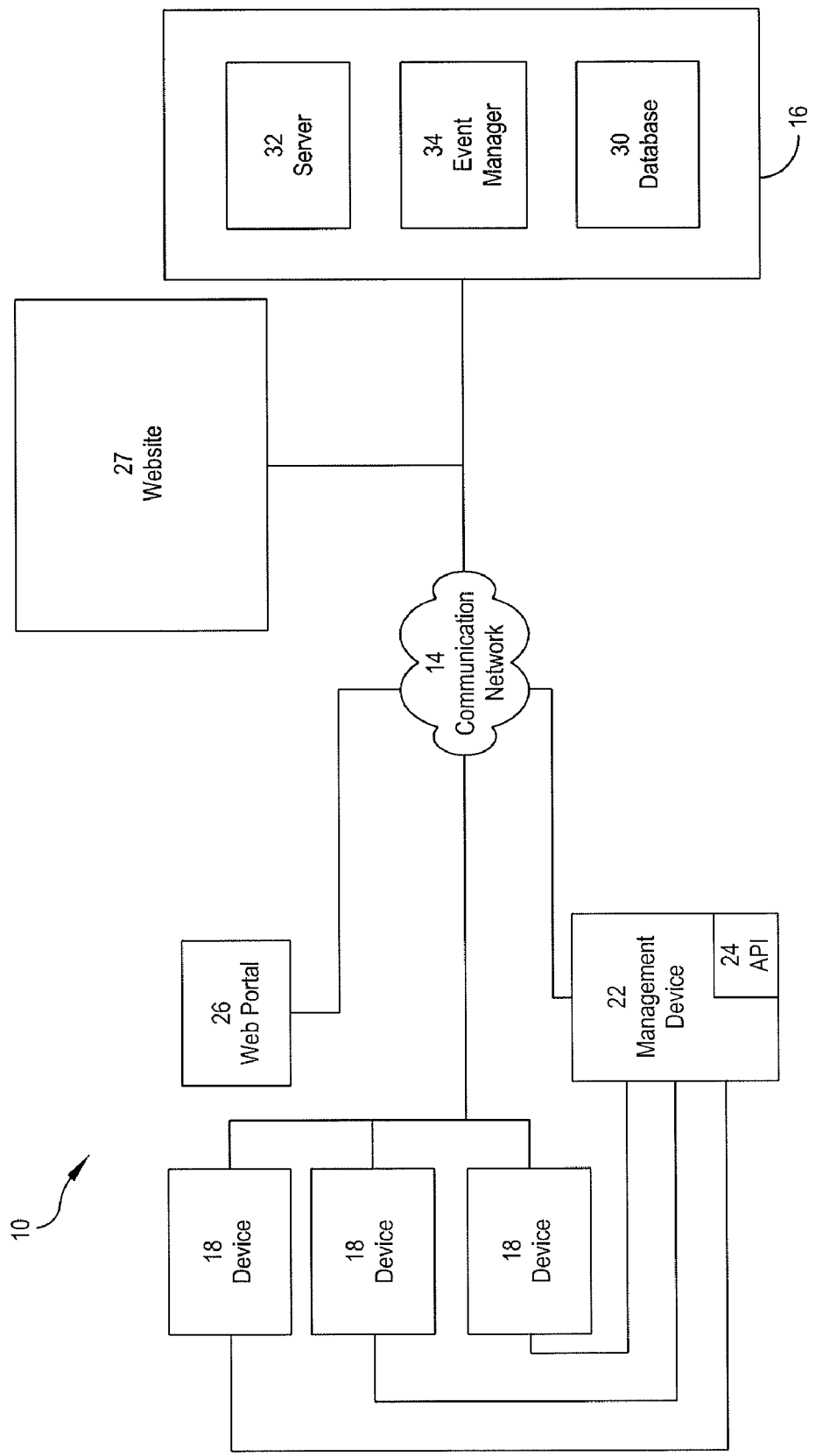
FIG. 1 is a diagram of a system for monitoring power status information for a remote location.

Referring to FIG. 1, a system 10 includes a customer site 12, a communications network 14 and a remote monitoring center 16. The customer site 12 includes monitored devices 18, a management device (MD) 22, a remote monitoring system application layer interface (API) 24 and a web portal 26. Each device 18 can have its own MD 22. The remote monitoring center 16 includes a database 30, a server 32 and an event manager/viewer 34. The server 32 and the remote devices 18 are configured with communication interfaces and coupled for uni-directional communication with the network 14. For example, the API 24 is embedded in the MD 22 to allow communication between the devices 18 and the network 14. The API 24 can be embedded within a management device, an ISX Manager®, and/or PowerChute® Business Edition (PCBE), or other hardware and software applications, for example. In at least some embodiments, the MD 22 is coupled directly to the communications network 14. The server 32 can be, e.g., a single computer server or a bank of servers, and information flowing into and out of the bank of servers may be load balanced. The communication network 14 can be any of a variety of communication networks currently known (e.g., the Internet, a local area network (LAN), a wide area network (WAN), an integrated services digital network (ISDN), a wireless network, etc.) or developed in the future. Although only one server 32 and three remote devices 18 are shown, other numbers of servers 32 and/or remote devices 18 may be used. For example, the monitoring center 16 may include a web server and a mail server separately. The monitored devices 18 can be any of several types of devices, e.g., uninterruptible power supplies, battery management systems or other electronic devices or groups of electronic devices, etc. The monitored devices 18 may be disposed remotely from each other such as in different zip codes, cities, counties, states, or countries.

The devices 18 communicate with the MD 22, which accepts data related to the status of the devices 18. Remote monitoring units other than the MD 22 can directly interact and communicate with the server 32 over the network 14. The MD 22 includes a processor for performing instructions in software in the API 24. The software in the MD 22 is also configured for general interaction with the devices 18. The MD 22 is configured to detect power status, temperature, humidity, load and other status information at the devices 18. The API 24 is embedded in the MD 22 and is configured as a software program to provide an interface between the devices and the server 32 at the remote monitoring center 16. The API 24 processes the information collected and sends the information via the communication network 14 to the server 32. The API 24 is configured to receive information regarding status from the server 32 via the network 14. Other configurations of the API 24 are possible such as pure hardware configurations, or combinations of hardware and software, etc.

The MD 22 can detect that a device 18 switches and/or has switched to battery operation, detect increases/decreases in temperature, and detect other activity indicating an event, such as an outage or a reduction or increase in power exceeding a threshold. In response to an event, the MD 22 produces and sends an indication of the event (e.g., power failing to meet requirements) that gets transmitted through the network 14 to the server 32. The event indication provides the server 32 with a variety of information regarding the event. For example, the information can include a time of the event. The MD 22 is configured to determine and report resolution of an event. The MD 22 is further configured to detect status information other than power considerations, such as load considerations, temperature, and humidity.

Information provided to the server 32 through the API 24 in the MD 22 is preferably provided using a low-level protocol and is done in a manner to reduce the likelihood of simultaneous high-reporting traffic. For example, the information is provided using an HTTP POST command, via email, via web services or via other techniques. The information is reported asynchronously from the API 24. Techniques can be used to help prevent reporting congestion including aggregating multiple power events into a single report and reporting them in one transaction.

The API 24 is configured to provide heartbeat signals to the server 32. The heartbeat signals provide periodic (or possibly aperiodic) indicia that the devices 18 are operational and that the equipment between the API 24 and the server 32 is operational and connected. The server 32 is configured to expect the heartbeat signals from the reporting units and to respond if one or more of the heartbeat signals are not received, e.g., within an expected time frame. For example, if no heartbeats are received in a threshold amount of time, the server 32 may determine that a failure has occurred in the reporting units, the devices 18, the network 14, and/or one or more connections of these devices/systems to the server 32. The server 32 may respond by indicating a failure. If multiple heartbeats from multiple reporting units are not received within the same time frame, the server 32 may surmise that the network 14 has failed or that another, relatively global (as opposed to isolated to a particular reporting unit) failure has occurred, such as a large-scale power outage.

The web portal 26 is configured to communicate over the network 14. Information entered at the web portal 26 is communicated to the event manager 34 via the network 14. The web portal 26 allows a customer to enter and modify profile data (e.g., customer registration info), view contracts, define event escalation rules related to the operation of a device 18, view an alarm/event log and view device specifics (product and model type) and data points. The customer registration information describing and/or identifying the customer and entered at the web portal 26 is sent to the database 30 for storage at the monitoring center 16. The server 32 processes the customer data with incoming data from the API 24. Customer data is associated with the device data at the monitoring center 16. Customer data is preferably sent once and mapped to the device 18 serial numbers, e.g., by cross referencing purchases made by the customer. The customer information is sent in XML format. The API 24 also sends device data in XML format, in configurable time periods, e.g., heartbeat data every 10 minutes and status data every 8-24 hours, although other formats are possible. For example, the customer registration information can be transmitted via a web service operated by the remote monitoring center 16. The customer can log on and enter registration information on an RMS web page, e.g., hosted by a server associated with the RMS 16, and transmit the entered data via a web service to the server 32. The server 32 is configured to host the web page for information entry.

Through the web portal 26, on-line help is available. Access permissions at the web portal 26 include Network Operations Center (NOC) super administrators, NOC administrators, NOC user, company administrators (e.g., for editing customer data and creating company users), and company user, which can be designated as read-only. Other access permissions can be enabled. The web portal 26 defines alarm/event escalation based on activity from the devices 18. Real time data graphs are generated based on the activity monitored and recorded at the monitoring center 16.

The customer registration information entered at the web portal 26 is transmitted via a website operated by the remote monitoring center 16. Alternatively, the website 27 can be operated by a party other than the remote monitoring service 16 provider. The customer logs on and enters registration information on a Remote Monitoring Service web page, and transmits the data via the communication network 14 to the server 32.

The server 32 is configured to receive and process (e.g., in a server processor) incoming power anomaly/event indicia from the API 24 and to provide server output signals that include power status information such as accumulated/aggregated and collated power anomaly information. The server 32 collects data from multiple individuals/companies/devices/organizations/locations. Information processed by the server 32 is stored in the database 30. The server 32 is configured to determine start times and end times of power anomalies and associated locations of the power anomalies. For example, the server determines start and end times by processing received indicia of beginnings and ends of power events, with associated information as to locations of the reporting units and/or the corresponding devices 18. The server 32 is configured to determine timing of events, as events are time stamped (or by cross-referencing a clock, etc.).

The server 32 accumulates the event information and other device information received to determine status reports on a per customer basis and provides reports to the event manager 34 and/or the customer. The reports indicate events occurring at one or a number of locations, and identify the device 18 affiliated with an event. The server 32 processes the information, whether the information is in email format, HTTP format or other known data formats. The data is parsed and stored on the database 30.

The event manager 34 is configured to receive and process output signals from the server 32 to provide desired information to users of the remote devices 18. For example, the server 32 receives data and associated customer information and the data are displayed by the event manager 34. The event manager 34 also evaluates the server output signals to determine whether action at the customer site 12 is warranted/desirable. The event manager 34 monitors incoming device alarms that are sent from the API 24. The API 24 acts as a proxy between the device 18 and the event manager 34, and substantially all data are sent through the API 24. The server 32 receives customer data via HTTP and device alarms via HTTP, both in XML format. The event manager 34 provides a hypertext link to the remote monitoring system web site 27.

The event manager 34 provides a built-in trouble ticketing system associated with the incoming alarms. Trouble ticket viewing is restricted to designated individuals at the customer site 12. Trouble ticket viewing can be provided, for example, at two permission levels: NOC personnel and Remote Monitoring System customers. The web portal 26 includes a built-in bulletin board for internal NOC notification. From the event manager 34, the monitoring operation center has a hyperlink to the remote monitoring website 27. Device information is retrieved from the remote service website 27.

Figure 2A:
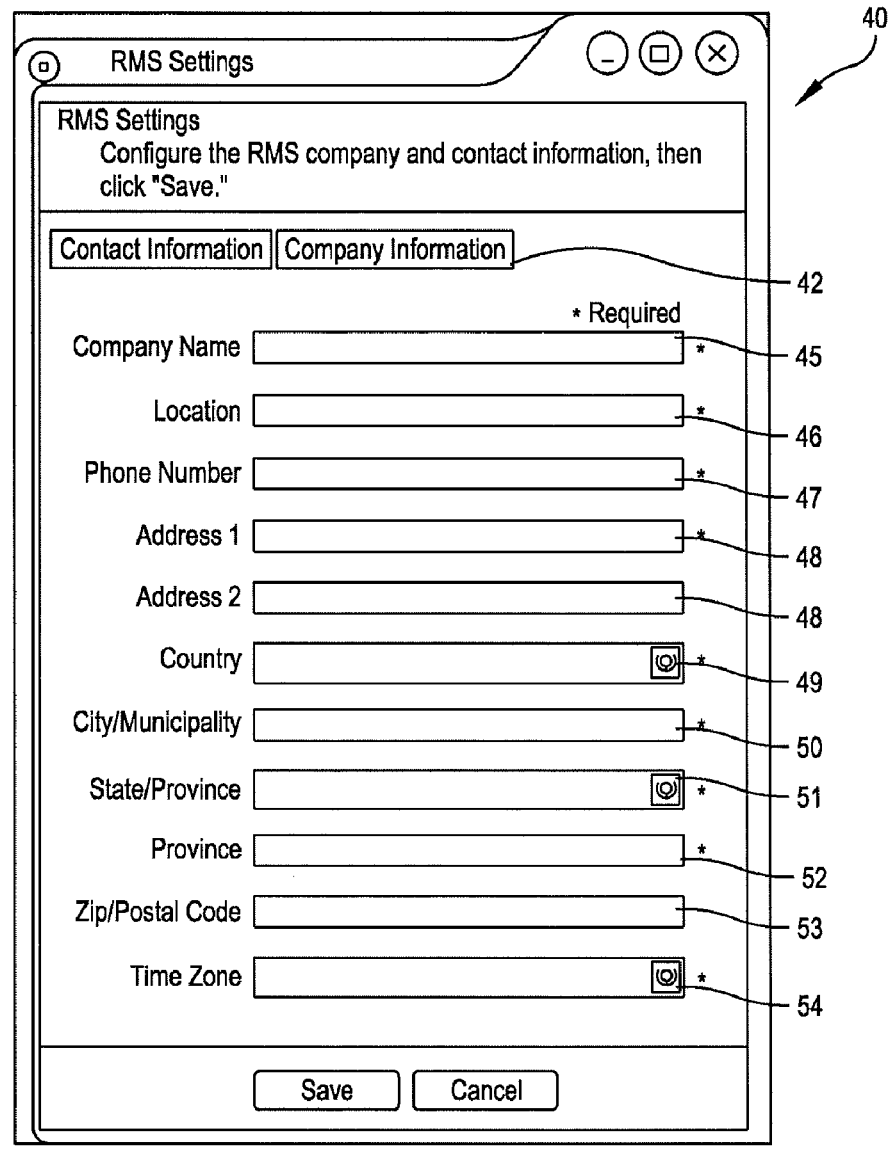
FIGS. 2A and 2B are exemplary screen displays for user registration associated with monitored locations.
Figure 2B:
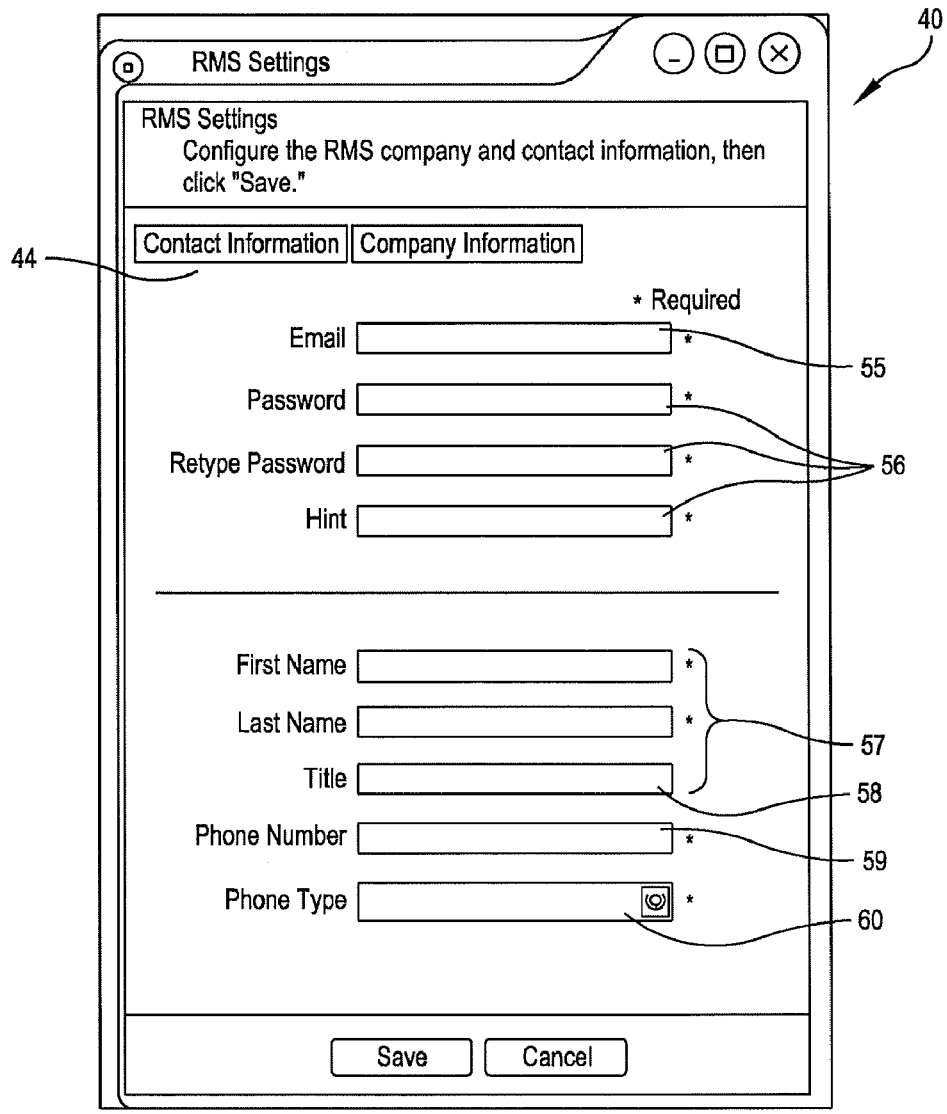

With continued reference to FIG. 1, and referring to FIGS. 2A-2B, a user having at least one device 18 registers for the monitoring system by completing profile data at the web portal 26. An RMS Settings screen 40 includes a company information page 42 and a contact information page 44. The company information page 42 prompts for entry of a company name 45, a location 46, a phone number 47, an address 48, a country 49, a city 50, a state 51, a province 52, a zip code 53 and a time zone 54. Other fields can be included on the company information page 42 (e.g., fields suited for other countries). The contact information page 44, shown in FIG. 2B, prompts for entry of an email address 55, a password setting 56, a name 57, a title 58, a phone number 59 and a phone type 60. Data entered are saved in the remote monitoring system database 30 and are accessible over the web portal 26 at the customer side and by the event manager 34 on the monitoring side. The RMS website 27 is accessed by the customer to update contact information. Customer information is sent to the monitoring center 16 from the monitored device 18 upon start-up of the device 18.

The customer information is XML formatted and is sent in an HTTP post and/or in an email message. Device registration is completed automatically by associating the device 18 with a customer using knowledge of which device 18 (including unique identifiers, e.g., serial numbers) the customer is using or has purchased. XML is a self describing computer language. XML allows the creation and format of custom document tags, as opposed to HTML which has fixed tags, e.g. <HEAD> and <BODY>. The exemplary customer XML template used to generate the customer registration information sent to the event manager is as follows:

```
<?xml version="1.0" encoding="UTF-8"?>
<!--DTD generated by XML Spy v4.4 U (http://www.xml-spy.com)-->
<!ELEMENT APCRMCustLink (Company+)>
<!ATTLIST APCRMCustLink
    xmlns:xsi CDATA #REQUIRED
    xsi:noNamespaceSchemaLocation CDATA #REQUIRED
>

<!ELEMENT Address1 EMPTY>
<!ELEMENT Address2 EMPTY>
<!ELEMENT Company (CompanyName, CompanyPhone, LocationList, DeviceContactList)>
<!ELEMENT CompanyName EMPTY>
<!ELEMENT CompanyPhone EMPTY>
<!ELEMENT Contact (FirstName, LastName, EmailAddress, Password?, Title, PhoneList)>
<!ATTLIST Contact
    Status (Active|Inactive) #REQUIRED
    Role (Admin|User) #REQUIRED
    Owner (False|True) #REQUIRED
>

<!ELEMENT ContactList (Contact+)>
<!ELEMENT CountryCode (#PCDATA)>
<!ELEMENT Device (DeviceDescription)>
<!ATTLIST Device
    Model CDATA #REQUIRED
    Identifier CDATA #REQUIRED
    ParentIdentifier CDATA #IMPLIED
>

<!ELEMENT DeviceContact EMPTY>
<!ATTLIST DeviceContact
    EmailAddress CDATA #REQUIRED
    Identifier CDATA #REQUIRED
    Priority (1|2|3|4|5) #REQUIRED
>

<!ELEMENT DeviceContactList (DeviceContact+)>
<!ELEMENT DeviceDescription EMPTY>
<!ELEMENT DeviceList (Device*)>
<!ELEMENT EmailAddress EMPTY>
<!ELEMENT FirstName EMPTY>
<!ELEMENT LastName EMPTY>
<!ELEMENT Location (LocationName, Address1, Address2?, Municipality, Region, PostalCode, CountryCode, Timezone, ContactList, DeviceList)>
<!ELEMENT LocationList (Location+)>
<!ELEMENT LocationName EMPTY>
<!ELEMENT Municipality EMPTY>
<!ELEMENT Password EMPTY>
<!ELEMENT Phone EMPTY>
<!ATTLIST Phone
    Type (cell|fax|home|office|phone) #REQUIRED
<!ELEMENT PhoneList (Phone+)>
<!ELEMENT PostalCode EMPTY>
<!ELEMENT Region EMPTY>
<!ELEMENT Timezone EMPTY>
<!ELEMENT Title EMPTY>
```

Figure 3B:
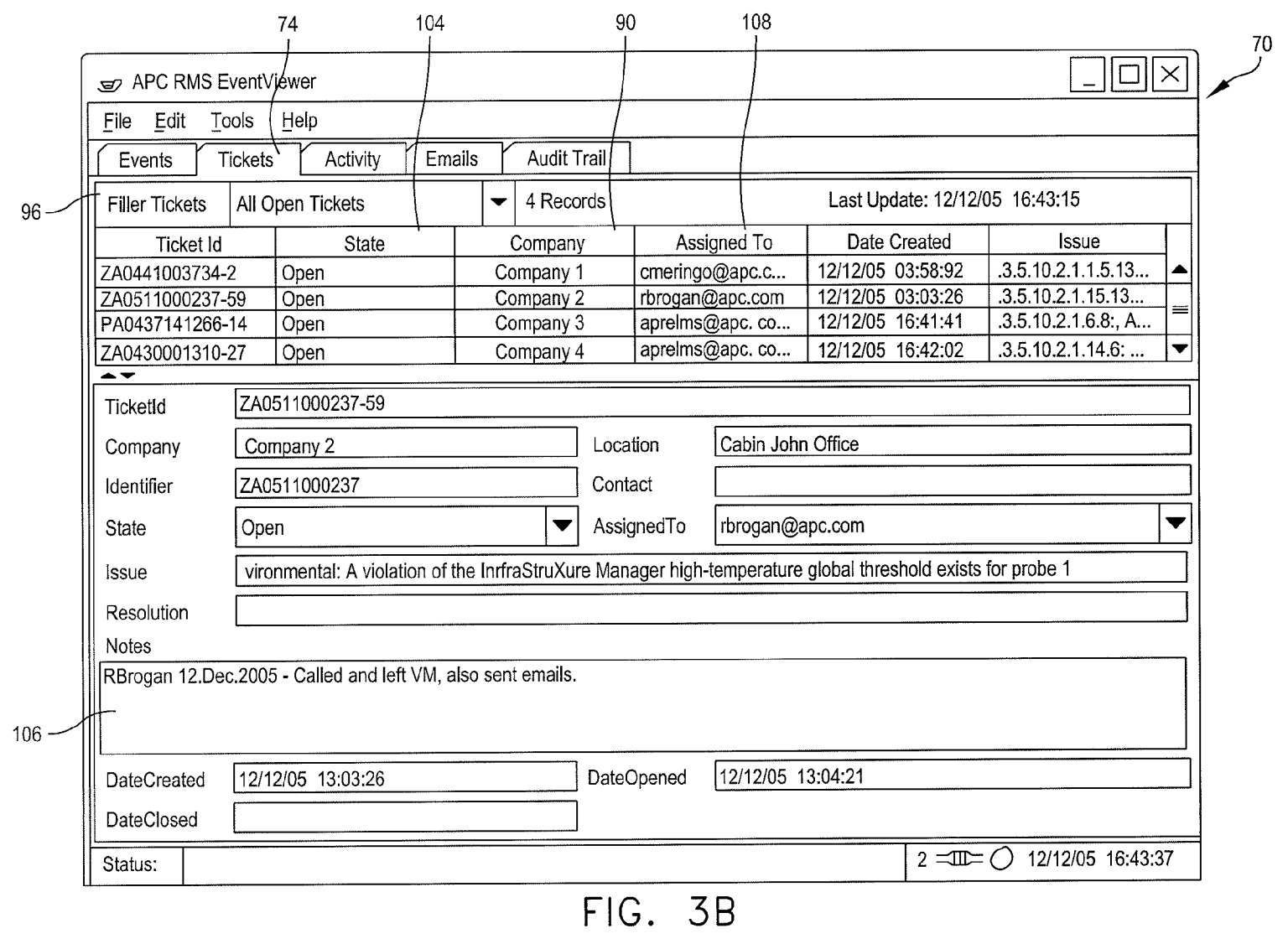
Figure 3C:

Referring to FIGS. 3A-3C, the event manager 34 is used by the remote monitoring center 16 to assess device status. The event viewer screen 70 provides a synopsis of data related to a device 18 for review at the event manager 34. Preferably, the event viewer screen 70 provides data on a number of customers per screen. The RMS event viewer screen 70 is accessible at the event manager 34. The event viewer screen 70 includes an events page 72 (FIG. 3A), a tickets page 74 (FIG. 3B), and an activities page 76 (FIG. 3C). The event viewer screen 70 can include an emails page 78, an audit trail page 80 and a callbacks page 82, as well as other pages. In FIG. 3A, a snapshot of the events page 72 includes fields for a company name 90, an identifier 92, an event description field 94, ticketID 96, a ticket state field 98, a count 100 and a date field 102. Information on the screen 72 can be filtered by any of the fields 90, 92, 94, 96, 98, 100 and 102. For example, in FIG. 3A, data are filtered by company name 90. In FIG. 3A, events 71 are color coded for visual inspection, i.e., such that the most severe events can be visually identified quickly. For example, severe events 73 can appear in red, while less severe events 75 can appear in blue, with different colors representing gradations of severity in between. Severe events automatically create trouble tickets which outline the escalation process specific to an event 94. An operator at the monitoring center 16 selects an event 71, follows the escalation steps, adds notes, creates bulletin boards and closes out open tickets in the ticket state field 98.

In FIG. 3B, information is sorted by open tickets 104. A selected open ticket 104 presents profile information for the customer 90, as well as notes 106 related to the status of the device 18. Each open ticket 104 is assigned to a service individual 108 residing at the monitoring center 16. Data related to the event, such as the frequency of the occurrence, the urgency and the device data are presented on the event viewer 70. Service is provided from the assigned individual 108 based on the event viewer 70 data. In FIG. 3C, activity related to a particular ticket identification can be viewed. A company contact 110 and mode of contact 112 are available to the service individual. The contact 110 can be contacted directly, or via passive means where indicated. The contact information is that collected from the website 27, where the customer has registered.

Referring to FIG. 4, a report is generated based on the data collected at the event manager 34. The report 120 includes an executive summary and details of the activity for a customer's devices 18 over a week, a month, a quarter, or a year. The report 120 can be generated over another specified duration, such as more frequently than a quarter, or less frequently than a quarter. The report 120 includes a contact portion 122 and an executive summary 124. An executive summary 124 includes a system availability analysis 126. The actions required section 128 provides a brief synopsis for the customer for any actions pending. The event summary includes an event summary table 130 and visual graph 132 showing the occurrence of severe, warning, informational and total events over the given time period. The report 120 also includes a severe events synopsis 134. A recommendations section 136 can, for example, include event manager recommendations to improve the efficiency of the devices 18 or to alter the system at a customer site. The report 120 also includes a details section 138. The details section 138 provides a snapshot of an identified device and its parameters over the time period. For example, the details section 138 can include a breakdown of device activity for UPSs 140, PDUs 142 and Environments 144 present at a customer site, or other numbers of such tables. Information, such as load percentage, runtime, balanced systems, power, and temperature and humidity are summarized in the device activity tables 140, 142 and 144. The report 120 can include as many or as few device activity tables as there are devices/systems at the customer site. System evaluation is possible via the periodic reports 120. The customer or user accesses the report 120 via the RMS website 27.

Figure 4A:
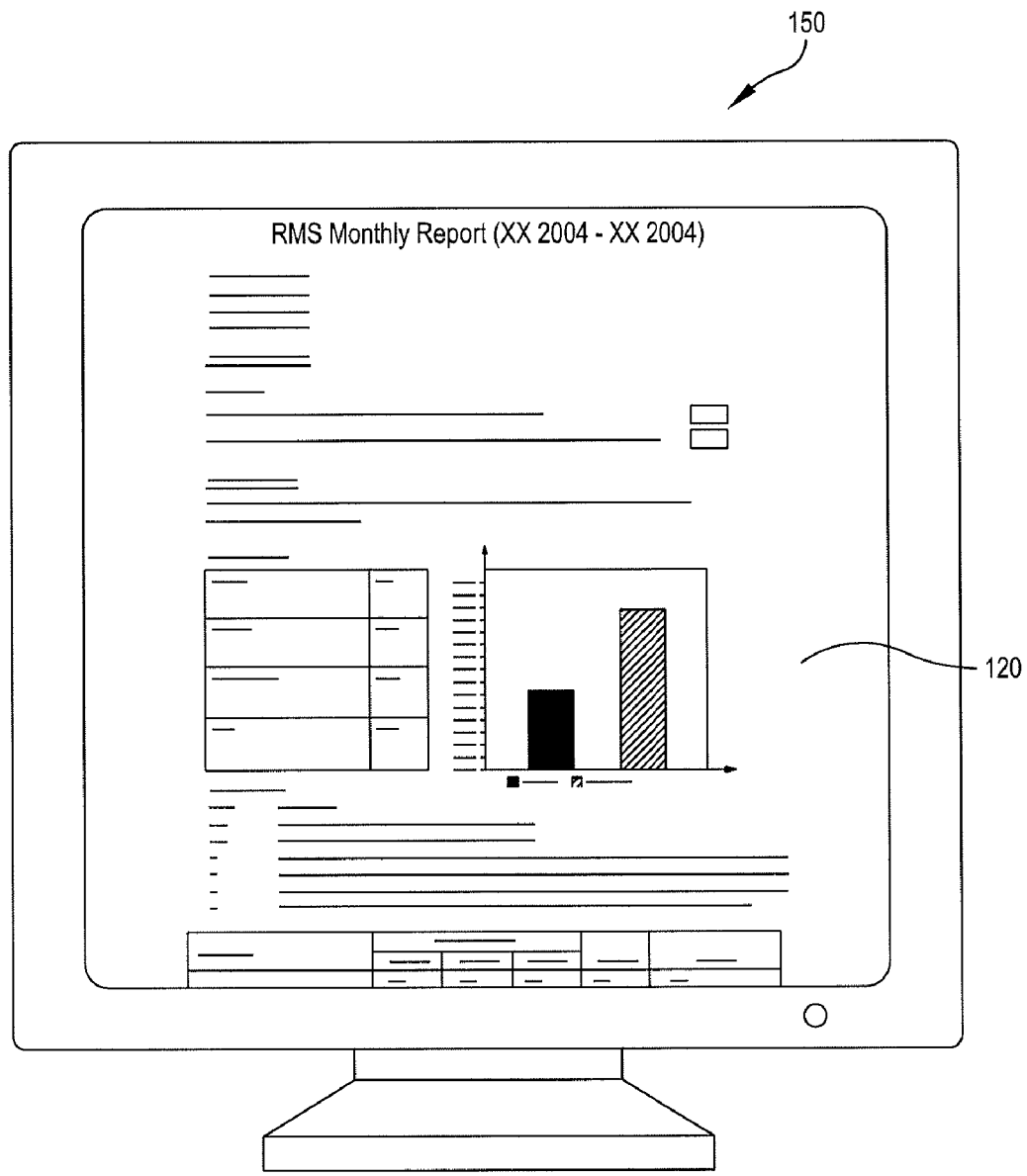
FIG. 4A is a computer monitor showing an exemplary report of status information as described in FIG. 4.

Referring to FIG. 4A, a computer monitor 150 includes the report 120 as a screen view. The report 120 may be arranged in a number of formats for presentation to the user. For example, the Contact data 122, executive summary 124, availability 126, actions required 128, event summary 130, graph 132, severe events summary 134, recommendations 136, and details 138 sections can be arranged in any order within the report 120. Different presentation formats, e.g., line graphs, pie charts, stacked bar charts, etc., may be used to provide the information. Further, additional information can be added or removed based on the event activity for the specified time period.

The remote monitoring system 10 and reporting system can be used for a variety of applications. An exemplary use of the system 10 is to provide an integrated monitoring system for use at a customer site. The customer site 12 can include one or more devices in the monitoring scheme. The system 10 can be integrated into an environment where a user has a separate monitoring center staff, rather than utilizing a centralized monitoring staff. These examples are not limiting, as other applications are within the scope of the invention.

Figure 5:
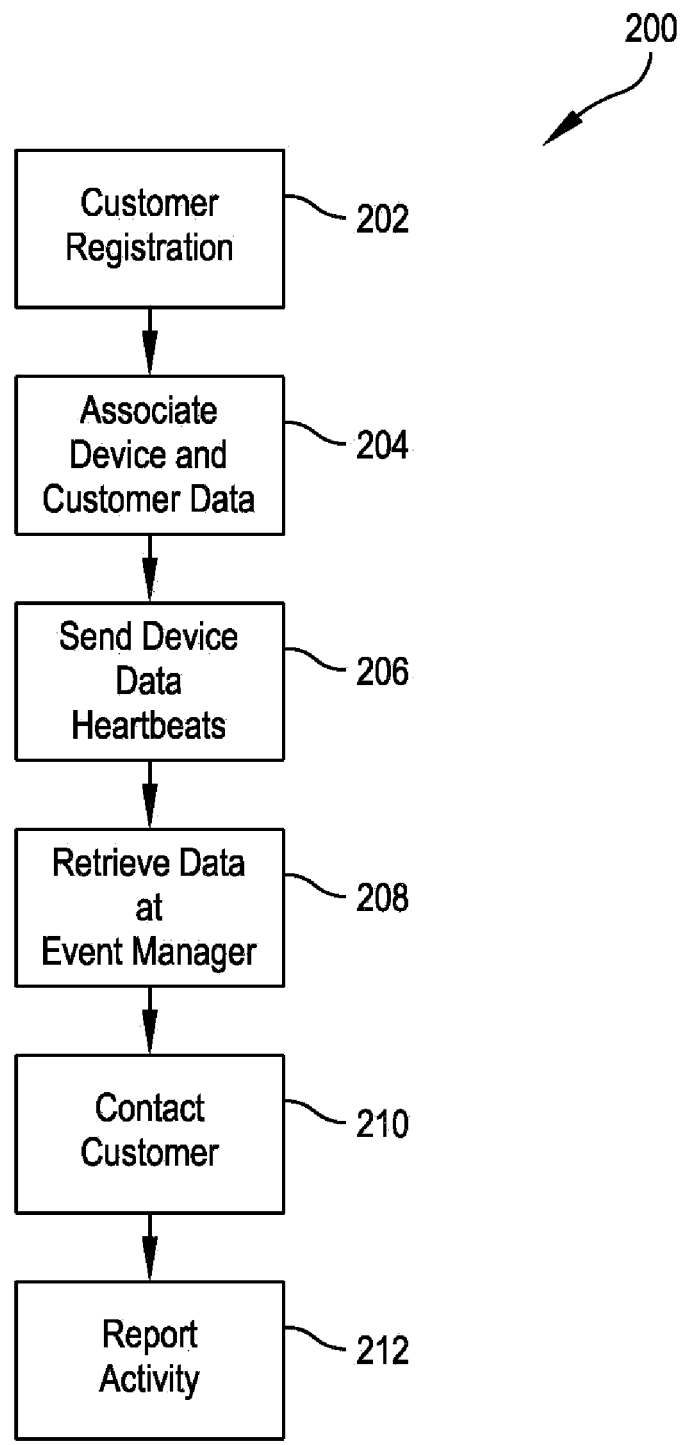
FIG. 5 is a block flow diagram of a process of monitoring power status information for a remote location.

In operation, referring to FIG. 5, with further reference to FIGS. 1-4, a process 200 for monitoring and reporting device status using the system 10 includes the stages shown. The process 200, however, is exemplary only and not limiting. The process 200 can be altered, e.g., by having stages added, removed, or rearranged.

At stage 202, a user registers by entering contact information at a web portal 26 or device user interface. The user can make a one-time entry of customer profile information. The user chooses to be a part of the remote monitoring service that monitors and reports status information of the devices 18 at the user site 12 by registering at the Remote Monitoring Service website 27. The website 27 can be operated by the remote monitoring center 16 or by a third party. The user enters information, such as name, location, address, time zone, and direct contact data. The customer data may also, or alternatively, be sent by XML or HTTP post. Device registration is accomplished automatically via the API 24.

At stage 204, a monitored device 18 is started up. At start-up, device information is sent automatically from the monitored device 18 to the event manager 34. User data and device data are associated at the monitoring center 16, e.g., using a lookup table with device information (e.g., serial number) and corresponding customer data. Devices at the user's location are associated with the user via the registration data entered at the web portal 26. The device data can be XML formatted and can be sent to the server 32 via HTTP post.

At stage 206, the API 24 sends heartbeats and/or separate or included indicia of power events for the device 18. For example, a power problem/event/anomaly or a return of power occurs at the device 18 and the API 24 reports the anomaly. The API 24 reports information regarding the time of the anomaly and the location of the device 18. The monitoring center 16 associates the incoming HTTP post with the customer data and stores the associated data in the database 30. The information is parsed, e.g., by reading tags, and data are retrieved for storage.

At stage 208, detailed device information is retrieved. The data are stored in the database 30. A staff member at the remote monitoring center 16 can review and monitor the device data using the event manager 34. For example, a staff member can inspect power activity, power outages, event occurrence and other status information related to one or many of the devices at one or more customer sites 12. The staff has a hyperlink to the remote monitoring website, and device information is retrieved for use at the event manager 34. Device specifics may not be duplicated at the event manager 34 due to the hyperlink.

At stage 210, the staff member at the event manager 34 contacts the customer based on the device data retrieved. For example, if an event 71 has occurred, the event manager 34 displays the severity of the event 71 via a color-coded list of events 71. The event manager 34 can contact a customer where an event has taken place.

At stage 212, the report 120 is generated, e.g., periodically. The report 120 provides a snapshot of the device activity over a specified duration. The report 120 can cover a set duration, such as a one-month period of activity. Users access the report via the RMS website 27, at the web portal 26 or received the report via email or via postal service. Evaluation and analysis of the event activity is provided through the report 120.

The process 200 depicts a preferable sequence of events. Other stages can be added, or the order of stages can be altered in the process 200. For example, device data can be received prior to receiving customer registration data. In this instance, the device data are held in a limbo state at the server 32 until the accompanying customer data is received.

Other embodiments are within the scope and spirit of the appended claims. For example, due to the nature of software, functions described above can be implemented using software, hardware (e.g., an embedded web card), firmware, hardwiring, or combinations of any of these. Features implementing functions may also be physically located at various positions, including being distributed such that portions of functions are implemented at different physical locations. Additionally, power status information can be provided only when an event occurs, rather than at regular intervals.

Other embodiments of the MD 22 are possible. For example, the MD 22 may be located in or attached to (e.g., inserted into a receptacle of) the devices 18. Such devices would be configured to communicate with the network 14 and provide management information.

What is claimed is:

1. A method for monitoring and reporting information regarding status of a power supply device operated by a user, the method comprising:

receiving, by a management device configured as a proxy for and located within an uninterruptible power supply (UPS) device, customer information from the user, the management device having an application interface configured to communicate over a communication network;

generating a customer information update based at least in part on the customer information and using a self-describing computer language;

sending the customer information update over the communication network to a remote computer;

detecting the status of the UPS using the management device;

generating a status update indication for the UPS using a self-describing computer language; and sending the status update indication over the communication network to the remote computer.

2. The method of claim 1, wherein sending the customer information update over the communication network to the remote computer comprises sending user registration information via email.

3. The method of claim 1, wherein sending the customer information update over the communication network to the remote computer comprises sending user registration information via HTTP post.

4. The method of claim 1, wherein sending the status update indication to the remote computer comprises sending the status update indication via HTTP post.

5. The method of claim 1, further comprising associating the user with the status update information for the UPS using at least one mapping of the user and the UPS.

6. The method of claim 1, wherein sending the customer information update over the communication network to the remote computer comprises sending user registration information via a web service, the web service communicating the user registration to the remote computer.

7. The method of claim 1, wherein the self describing computer language includes eXtensible Markup Language (XML).

8. A system for communicating via a communication network with a plurality of power supply devices connected to a plurality of management devices to monitor and supply a status associated with the plurality of power supply devices, the system comprising:

at least one uninterruptible power supply (UPS); and at least one management device located within the UPS and configured to act as a proxy for the UPS, the at least one management device comprising:

a first processor; and a first memory coupled to the first processor and including instructions that when executed by the first processor implement:

a first communication interface configured to transfer status data associated with the at least one UPS over the communication network; and a second communication interface configured to:

receive a user registration for a user of the at least one UPS; and transfer data related to the user registration for the user; and at least one remote computer comprising a second processor configured to:

receive the status data and the user registration data over the communication network;

associate the user registration data with the status data; and implement a manager configured to report the status data to the user.

9. The system of claim 8, further comprising a remote monitoring service web site configured to allow the user to maintain user registration data.

10. The system of claim 8, wherein the manager produces an event ticket when the status data indicates a change in status.

11. The system of claim 8, wherein the second processor is further configured to inspect and manage user contracts associated with the user, and associate the status data and the user registration data based on information in the user contracts.

12. The system of claim 8, wherein the manager creates an executive report and communicates the executive report to the user over a third communication interface.

13. The method of claim 1, wherein receiving, by the management device, customer information from the user includes receiving company information.

14. The method of claim 1, wherein receiving, by the management device, customer information includes receiving customer information via a user interface.

15. The method of claim 14, wherein the act of sending the customer information update over the communication network to a remote computer is performed upon startup of the UPS.

* * * * *